J. W. VALENTINE.

Sweat-Band for Hats and Caps.

No. 8,880. Reissued Sept. 2, 1879.

Attest;
Geo. H. Graham
Herm. Muenter

Inventor
James W. Valentine
by Munson & Philipp
Attys.

UNITED STATES PATENT OFFICE.

JAMES W. VALENTINE, OF NEW ORLEANS, LOUISIANA.

IMPROVEMENT IN SWEAT-BANDS FOR HATS AND CAPS.

Specification forming part of Letters Patent No. 178,689, dated June 13, 1876; Reissue No. 8,880, dated September 2, 1879; application filed August 8, 1879.

*To all whom it may concern:*

Be it known that I, JAMES W. VALENTINE, of the city of New Orleans and State of Louisiana, have invented certain new and useful Improvements in Sweat-Bands for Hats and Caps; and I do hereby declare the following to be a full, clear, and exact description of the same, reference being had to the annexed drawings, making a part of this specification.

My invention consists of a sweat-band for hats or caps having a double edge flanged lower edge; also, of a sweat-band for hats or caps having a double edge flanged lower edge provided with a spring to stiffen the same; also, of a sweat-band for hats or caps having combined therewith a fastening-lining, said fastening-lining serving to attach the sweat-band to the hats or caps; also, of a sweat-band for hats or caps having a double edge flanged lower edge, and having also combined therewith a fastening-lining; also, a sweat-band for hats or caps having a double edge flanged lower edge stiffened by a spring, and having also combined therewith a fastening-lining; also, of a sweat-band for hats or caps having a metallic fastening capable of passing through the hat or cap, and being bent thereon to attach the sweat-band to the hat or cap, all of which will be more fully hereinafter described.

Figure 1:
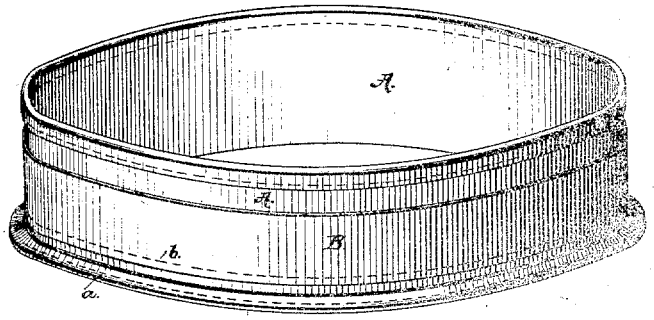
Figure 2:
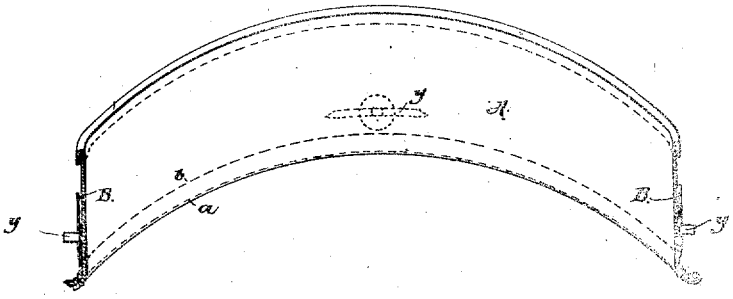
Figure 3:
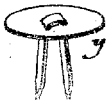

In the drawings, Figure 1 is a perspective view of a sweat-band containing my invention ready to be applied to a hat or cap. Fig. 2 is a sectional view of the sweat-band. Fig. 3 is a perspective view of a metallic fastening for securing the sweat-band to the hat, as shown in Fig. 2.

In the drawings, A represents the sweat-band, which is preferably made of leather. The lower edge of this sweat-band is provided with a doubled edge flange projecting outward from said band, this flange serving to prevent the sweat-band from being pulled into the hat or cap, to give a finish to the sweat-band, and prevent the perspiration from coming in contact with the hat or cap, and to make the sweat-band more comfortable to the head. This doubled edge flange is stiffened by a whalebone or steel spring, secured thereto by a line of stitching, *a*, in a manner similar to that in which cord is applied to wearing apparel.

B is what may be termed a "fastening-lining." It is secured by a line of stitching, *b*, near its lower edge to the sweat-band A. This lining B serves as a means for attaching the sweat-band A to the hat or cap.

As shown in the drawings, the sweat-band A is secured to the hat by means of metallic fastenings *y*, such as is shown in Fig. 3 of the drawings, by inserting the pointed ends of the same from the inner side of the lining B through the said lining and hat, over the outer surface of which latter they are bent back and hidden by a ribbon or band applied in the usual manner.

It will be seen that a sweat-band containing my invention can be readily applied by any person of ordinary intelligence, and that its use will preserve hats or caps from perspiration, causing the same to last for a much longer period of time than if supplied with any other sweat-band of which I had knowledge at the date of my invention.

Having thus described my invention, what I claim as new, and desire to secure by Letters Patent, is—

1. A sweat-band for hats or caps having a double edge flanged lower edge, substantially as described.

2. A sweat-band for hats or caps having a double edge flanged lower edge stiffened by a spring secured thereto, substantially as described.

3. A sweat-band for hats or caps having combined therewith a fastening-lining, said fastening lining serving as a means for attaching said sweat-band to the hat or cap, substantially as described.

4. A sweat-band for hats or caps having a double edge flanged lower edge, and having also combined therewith a fastening lining, substantially as described.

5. A sweat-band for hats or caps having a double edge flanged lower edge stiffened by a spring, and having also combined therewith a fastening lining, substantially as described.

6. The combination, with the fastening lining B of a sweat-band for hats or caps, of metallic fasteners passing through the fastening lining and the hat or cap and bent back upon the outer surface of the latter, substantially as described.

In testimony whereof I have hereunto set my hand in the presence of two subscribing witnesses.

JAMES W. VALENTINE.

Witnesses:
J. W. COREY,
H. T. MUNSON.